United States Patent

Brennecke et al.

[11] Patent Number: 5,817,199
[45] Date of Patent: Oct. 6, 1998

[54] METHODS AND APPARATUS FOR A FULL WIDTH ULTRASONIC BONDING DEVICE

[75] Inventors: Craig Steven Brennecke, New London; Jeffery Ray Cottingham, Appleton; Paul Gordon Klemp, Hortonville; Jeffrey Joseph Samida, Appleton, all of Wis.

[73] Assignee: Kimberly-Clark Worldwide, Inc., Neenah, Wis.

[21] Appl. No.: 813,512

[22] Filed: Mar. 7, 1997

Related U.S. Application Data

[60] Provisional application No. 60/034,262 Dec. 20, 1996.

[51] Int. Cl.$^6$ .................................................. B32B 31/00
[52] U.S. Cl. ..................... 156/73.1; 156/290; 156/308.4; 156/553; 156/554; 156/555; 156/580.1; 156/580.2; 264/444; 425/174.2
[58] Field of Search ................................... 156/73.1, 290, 156/308.4, 553, 554, 555, 580.1, 580.2, 582; 264/442, 443, 444; 425/174.2

[56] References Cited

U.S. PATENT DOCUMENTS

| | | | |
|---|---|---|---|
| 3,844,869 | 10/1974 | Rust, Jr. | 156/358 |
| 3,879,256 | 4/1975 | Rust, Jr. | 156/580 |
| 4,394,208 | 7/1983 | Wang et al. | 156/580.1 |
| 4,414,045 | 11/1983 | Wang et al. | 156/73.2 |
| 4,419,160 | 12/1983 | Wang et al. | 156/73.2 |
| 4,426,244 | 1/1984 | Wang | 156/498 |
| 4,427,485 | 1/1984 | Kutnyak et al. | 156/429 |
| 4,504,539 | 3/1985 | Petracek et al. | 428/195 |
| 4,713,132 | 12/1987 | Abel et al. | 156/73.1 |
| 4,758,293 | 7/1988 | Samida | 156/73.1 |
| 5,087,230 | 2/1992 | Neuwirth | 156/580.2 |
| 5,096,532 | 3/1992 | Neuwirth et al. | 156/580.1 |
| 5,110,403 | 5/1992 | Ehlert | 156/580.1 |
| 5,552,013 | 9/1996 | Ehlert et al. | 156/555 |
| 5,645,681 | 7/1997 | Gopalakrishna et al. | 156/580.2 |
| 5,660,679 | 8/1997 | Rajala et al. | 156/580.1 |
| 5,733,411 | 3/1998 | Bett | 156/580.2 |

FOREIGN PATENT DOCUMENTS

| | | |
|---|---|---|
| 0 0840904 A2 | 8/1983 | European Pat. Off. |
| 2 163 743 | 7/1973 | France . |
| 2 440 241 | 5/1980 | France . |
| 5 507 531 | 12/1982 | France . |
| 2 677 049 | 4/1992 | France . |
| 69-247023 | 10/1988 | Japan . |
| 703756 | 2/1954 | United Kingdom . |
| 990833 | 5/1965 | United Kingdom . |

*Primary Examiner*—James Sells
*Attorney, Agent, or Firm*—Thomas D. Wilhelm; Brian R. Tumm

[57] ABSTRACT

This invention relates to apparatus and methods for fabricating a web or consolidating web precursor material in fabricating a web. The invention comprises ultrasonic bonding apparatus including an anvil roll receiving web materials thereon and receiving first and second rotary ultrasonic horns. The rotary ultrasonic horns, in combination with the anvil roll, ultrasonically bond segments of e.g. first and second webs to each other. Third and fourth rotary ultrasonic horns spaced about the circumference of the anvil roll, in combination with the anvil roll, ultrasonically bond other segments of the webs to each other. The full widths of the webs can be ultrasonically bonded using the rotary ultrasonic horns. An outer surface of the anvil roll preferably carries a bonding pattern defining the locations where bonding of the webs occurs. Additional e.g. third and fourth webs can be bonded by the ultrasonic bonding apparatus. Such bonding can occur after first and second webs have been bonded to each other by first and second rotary ultrasonic horns. In some instances, the third and fourth rotary ultrasonic horns can ultrasonically bond portions of the first and second webs that have already been bonded together by one or both of the first and second rotary ultrasonic horns. In other embodiments, multiple repeat bonding of substantially the same segment of the web can occur. In still other embodiments, a batt of bondable material such as fibers can be consolidated by ultrasonic bonding with rotary ultrasonic horns to form a unitary web. The apparatus can operate at web speeds greater than 1000 feet minute.

49 Claims, 7 Drawing Sheets

METHODS AND APPARATUS FOR A FULL WIDTH ULTRASONIC BONDING DEVICE

This application claims priority from U.S. Provisional Application No. 60/034,262 filed on Dec. 20, 1996.

FIELD OF THE INVENTION

The present invention relates to methods and apparatus for bonding webs to each other. More particularly, the invention relates to ultrasonic bonding of webs using multiple ultrasonic horns and an anvil.

BACKGROUND OF THE INVENTION

Ultrasonic bonders are known in the art. Stationary plunge-horn ultrasonic bonders are limited to operating on webs traveling at low speeds because, among other reasons, at higher web speeds, the web being operated on tends to pile up, or bunch up, at the leading edge of the plunge-type stationary ultrasonic horn.

U.S. Pat. No. 3,879,256 to Rust, Jr. discloses apparatus for welding thermoplastic sheet-like elements wherein two rows of stationary ultrasonic plunge-type horns, backed up by an anvil, in combination, produce a bonded fabric. The anvil has projections which form a pattern on the sheet-like elements.

U.S. Pat. No. 3,844,869 to Rust, Jr. discloses similar apparatus for joining sheets of thermoplastic material by ultrasonic vibration. However, a single stationary ultrasonic resonator extends across the width of the sheets. The single ultrasonic resonator applies ultrasonic energy to join the respective sheets to one another.

U.S. Pat. No. 4,414,045 to Wang et al discloses apparatus for forming non-woven fabric from a batt of random, loose, fibers, using stationary ultrasonic horns as the mechanism for consolidating the fibers into the fabric. Respective arrays of ultrasonic horns extend across the path of advance of the batts, and overlie corresponding anvils spaced longitudinally along the path of advance of the batts. Column 6, lines 33–37 recites operating the apparatus at a web speed of about 150 meters/minute, calling such speed a "high speed." Typical production speed is described at column 1, lines 47–55 as 10–30 meters/minute.

SUMMARY OF THE DISCLOSURE

The present invention relates to methods and apparatus for fabricating webs, including composite multiple-layer webs, and focuses on forming such webs by ultrasonic bonding applied across the widths of webs or web precursors, in some embodiments across the entirety of the common width of multiple webs or web layers.

In a first family of embodiments, the invention comprehends methods of fabricating a composite web having a length and a width. First and second webs are disposed in surface-to-surface relationship with each other. Each web comprises first, second, third and fourth segments. Each segment of each web comprises a separate and distinct part of the width of the respective web, and extends along substantially the entire length of the respective web. The segments in each web are substantially parallel with respect to each other. The first and second webs are brought into surface-to-surface alignment with an anvil roll. First and second rotary ultrasonic horns are applied to the webs, ultrasonically bonding the first segment of the first web to the first segment of the second web, on the anvil roll at a first location between the anvil roll and the first rotary ultrasonic horn, and bonding the third segment of the first web to the third segment of the second web at a second location angularly spaced about an axis of the anvil roll from the first location. Third and fourth rotary ultrasonic horns are applied to the web, ultrasonically bonding the second segment of the first web to the second segment of the second web, on the anvil roll at a third location, and bonding the fourth segment of the first web to the fourth segment of the second web at a fourth location on the anvil roll spaced from the third location. The third and fourth bonding locations are spaced about the circumference of the anvil roll from the first and second bonding locations. The ultrasonic bonding thus bonds the first and second webs to each other at the first, second, third and fourth segments, and thereby forms the composite web.

In some embodiments, the first, second, third and fourth segments in each of the first and second webs, in combination, comprise substantially the entire widths of the webs. Substantially the entire length of the segments can be continuously bonded by the rotary ultrasonic horns.

In some embodiments, the webs are drawn across the anvil roll and through nips defined between the anvil roll and the respective rotary ultrasonic horns at a speed of at least about 600 feet/minute. The speed can comprise at least about 1000 feet/minute. In some embodiments, the mechanical loading of the webs, through the combination of the rotary ultrasonic horn and the anvil roll, can comprise up to about 50 pounds of pressure per linear inch width across the energy-applying surface of the ultrasonic horn. In some embodiments, each rotary ultrasonic horn can preferably apply up to about 800 Watts of energy to the web.

In preferred embodiments, the first and second rotary ultrasonic horns are spaced from each other and have respective first and second axes of rotation, the second axis of rotation being substantially aligned with the first axis of rotation, the first axis of rotation being substantially perpendicular to the direction of travel of the first and second webs. The third and fourth rotary ultrasonic horns can be mounted in a similar arrangement with respect to each other and the webs.

In some embodiments, the first and second rotary ultrasonic horns are staggered with respect to the third and fourth rotary ultrasonic horns such that the webs are bonded to each other over substantially the entireties of the common widths of the two webs.

In most embodiments, the anvil roll has a pattern of raised elements on an outer circumferential surface thereof. The rotary ultrasonic horns and the anvil roll, in combination, bond the first and second webs to each other at the raised elements.

In some embodiments, a third web is disposed onto at least one of the first and second webs after the ultrasonic bonding of the first and second webs to each other. The third and fourth rotary horns then apply ultrasonic energy to the third web, thereby bonding the first, second and third webs to each other.

In some embodiments, ultrasonic bonding applied by one of the third and fourth ultrasonic horns overlaps with ultrasonic bonding applied by one of the first and second ultrasonic horns, such that at least one of the third and fourth rotary ultrasonic horns applies ultrasonic energy to previously ultrasonically bonded portions of the first and second webs.

In a second family of embodiments, apparatus for constructing a composite web comprises apparatus bringing first and second webs in surface-to-surface relationship with each other, each web comprising segments, the segments extending along substantially the entire length of the respective web. An anvil roll is mounted for rotation, and for receiving thereon the first and second webs. First and second rotary ultrasonic horns are disposed at first and second locations spaced from each other, and adjacent the anvil roll. The first and second rotary ultrasonic horns, and anvil roll, in combination, bond first and third segments of the first web to respective first and third segments of the second web. Third and fourth rotary ultrasonic horns are disposed at third and fourth locations spaced from each other, and adjacent the anvil roll. The third and fourth locations are angularly spaced about an axis of the anvil roll from the first and second locations. The third and fourth rotary ultrasonic horns bond second and fourth segments of the first web to respective second and fourth segments of the second web.

In some embodiments, the third and fourth rotary ultrasonic horns are spaced about 180 degrees about the axial circumference of the anvil roll from the respective first and second rotary ultrasonic horns. The single anvil roll facilitates registration of bond loci in the third and fourth segments with bond loci in the first and second segments.

In a third family of embodiments, the invention comprehends methods of fabricating a composite web. The method contemplates disposing first and second webs in surface-to-surface relationship with each other. Each web has imaginary first, second, and third segments extending longitudinally thereof. First and second rotary ultrasonic horns are used to ultrasonically bond the first segment of the first web to the first segment of the second web, at a first location between the anvil roll and the first rotary ultrasonic horn, and to bond the third segment of the first web to the third segment of the second web at a second location between the rotary anvil and the second rotary ultrasonic horn, spaced from the first location. A third rotary ultrasonic horn is used to ultrasonically bond the second segment of the first web to the second segment of the second web, at a third location between the rotary anvil and the third rotary ultrasonic horn, spaced from the first and second locations. The first, second, and third rotary ultrasonic horns are configured and spaced across the width of the first and second webs at the respective first through third locations in a staggered arrangement. Namely, the third location is angularly spaced about an axis of the anvil roll, from the first and second locations, and is aligned for bonding a (third) segment of the webs which is between the (first and second) segments which are bonded by the first and second rotary ultrasonic horns. The ultrasonic bonding thus bonds the entirety of the common width of the first and second webs to each other at the first, second, and third segments, and thereby forms the composite web.

The first web can have a greater width than the second web, in which case the entirety of the width of second web is typically, but not necessarily, bonded to the first web.

The method can include disposing the first and second webs on an anvil roll and bonding the first, second, and third segments of the respective webs to each other on the anvil roll.

The invention further comprehends the first and second rotary ultrasonic horns, spaced apart from each other at a common angle with respect to the axis of rotation of the anvil roll, and having respective first and second axes of rotation, the second axis of rotation of the second rotary ultrasonic horn being substantially aligned with the first axis of rotation of the first ultrasonic horn, and substantially perpendicular to the direction of travel of the first and second webs. The third rotary ultrasonic horn has a third axis of rotation, substantially perpendicular to the direction of travel of the first and second webs.

In a fourth family of embodiments, the invention comprehends fabricating a composite web having a length and a width, using multiple applications of ultrasonic energy. The method comprises disposing first and second webs in surface-to-surface relationship with each other, using a first rotary ultrasonic horn, applying ultrasonic energy to first bond loci on the first web and, through the first bond loci, to second bond loci on the second web, and subsequently, using a second rotary ultrasonic horn, applying ultrasonic energy to the first bond loci of the first web and thereby to the second bond loci of the second web, The ultrasonic energy applied by the first rotary ultrasonic horn causes a first effect in the respective webs at the first and second bond loci. The ultrasonic energy applied by the second rotary ultrasonic horn causes a second effect in the respective webs at the first and second bond loci. The combination of the first and second effects bonds the first and second webs to each other at the first and second bond loci.

The first effect can comprise forming bonds bonding the first and second webs to each other, the bonds having first bond strengths. The second effect can comprise increasing the strengths of bonds formed by the first effect.

In some embodiments, the first effect does not form significant bonding between the first and second webs, and the second effect does form significant bonding between the first and second webs.

In some embodiments, the method includes applying substantially equal amounts of ultrasonic energy to the first and second webs through the first and second rotary ultrasonic horns.

In some embodiments, the sequential applications of ultrasonic energy are performed on an anvil roll. The use of the anvil roll, in common, facilitates registration of bond loci activated as the first effect with bond loci activated as the second effect.

Figure 1:
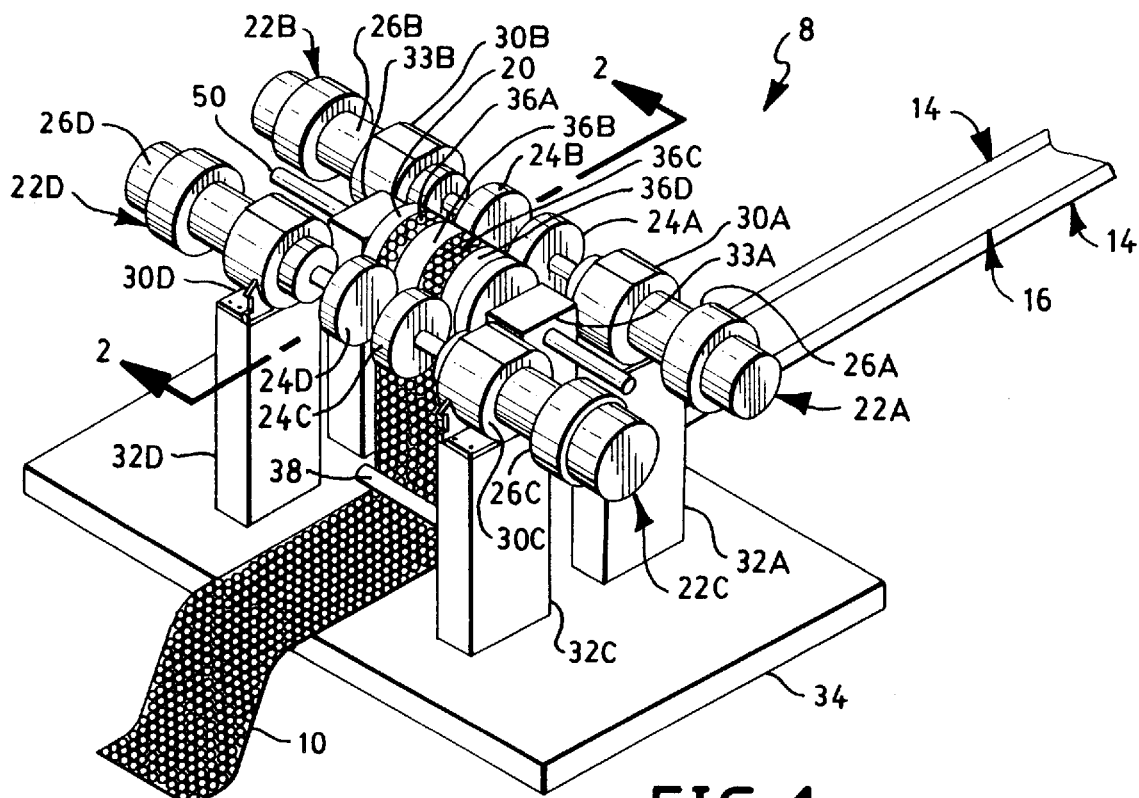
FIG. 1 shows a pictorial view of ultrasonic bonding apparatus of the invention.

The invention is not limited in its application to the details of the construction and the arrangement of the components set forth in the following description or illustrated in the drawings. The invention is capable of other embodiments or of being practiced or carried out in various ways. Also, it is to be understood that the terminology and phraseology employed herein is for purpose of description and illustration and should not be regarded as limiting. Like reference numerals are used to indicate like components. Further, the above drawings are not drawn to scale and do not so limit the invention.

DETAILED DESCRIPTION OF THE ILLUSTRATED EMBODIMENTS

The present invention is directed toward apparatus and methods for fabricating a web by utilizing ultrasonic bonding. An exemplary method ultrasonically bonds the full common width of first and second webs using a single anvil roll and multiple rotary ultrasonic horns.

Figure 2:
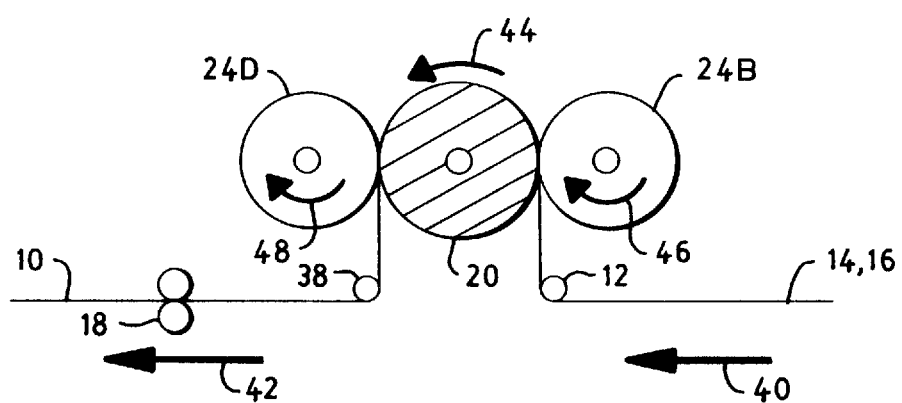
FIG. 2 shows a cross-section of the anvil roll, and associated rotary ultrasonic horns, taken at 2—2 in FIG. 1.

FIGS. 1 and 2 illustrate a first an embodiment of ultrasonic bonding apparatus 8 for fabricating composite web 10. Turning roll 12 turns webs 14 and 16 toward anvil roll 20. First web 14 and second web 16 are in surface-to-surface relationship with each other, both at turning roll 12 and at anvil roll 20. First and second webs 14, 16 are drawn about turning roll 12 and anvil roll 20 by a pair of nip rolls 18. See FIG. 2.

Ultrasonic energy application devices 22A, 22B, 22C, 22D are positioned at first and second locations angularly spaced about the axis of anvil roll 20. Ultrasonic energy application devices 22A–22D include respective rotary ultrasonic horns 24A, 24B, 24C, 24D and ultrasonic conduit units 26A, 26B, 26C, 26D. Respective mounting brackets 30A, 30B, 30C, 30D secure ultrasonic energy application device 22A, 22B, 22C, 22D to supports 32A, 32B (not shown), 32C, 32D. Supports 32A–32D are secured to base plate 34. Mounting brackets 30A–30D bracket and secure ultrasonic energy application devices 22A–22D to first, second, third, and fourth supports 32A–32D. Anvil roll supports 33A, 33B support anvil roll 20 between the respective ultrasonic energy application devices.

First and second ultrasonic energy application devices 22A, 22B, in combination with anvil roll 20, apply ultrasonic energy to first and second webs 14, 16 at first and second locations, corresponding to a first common circumferential location on anvil roll 20. The ultrasonic energy applied forms bonds in respective first and third segments 36A, 36C of first and second webs 14, 16. For purposes of illustration, the bonded first and second segments 36A, 36C are shown having a defined pattern in FIG. 1. Second and fourth unbonded segments 36B, 36D have not, to that point, been worked by ultrasonic energy. Thus, in the scenario just described, no bonds have yet been formed by apparatus 8 in the second and fourth segments.

Anvil roll 20 rotates at a surface speed corresponding with the speed of advance of the webs, namely the speed at which webs 14, 16 are drawn by nip rolls 18. Webs 14, 16 thus maintain a constant and static registration with the outer surface of anvil roll 20 as the webs advance about the circumference of the rotating anvil roll 20. Thus, webs 14, 16 advance together with the outer circumferential surface of anvil roll 20. As webs 14, 16 advance from the first and second bonding locations, anvil roll 20 carries webs 14, 16 toward third and fourth ultrasonic energy application devices 22C, 22D. Third and fourth ultrasonic energy application devices 22C, 22D, in combination with anvil roll 20, apply ultrasonic energy to webs 14, 16 at third and fourth locations corresponding to a second common circumferential location on anvil roll 20. The ultrasonic energy applied forms bonds in respective second and fourth segments 36B, 36D of first and second webs 14, 16 to thereby form composite web 10. Where, as shown in FIG. 1, the first, second, third, and fourth segments abut each other, webs 14, 16 are thus bonded to each other over the full common width of the two webs between the first and fourth segments, whereby full common width bonding is achieved. Additional bonding outwardly of the common width, such as outwardly of web 16, may be obtained if desired.

Composite web 10 then advances about second turning roll 38 and downstream for further processing or usage as a finished product.

The cross-sectional view of FIG. 2 shows the orientation of ultrasonic horns 24B, 24D with respect to the circumference of anvil roll 20. For clarity of illustration, certain elements, such as supports 32A–32D, are not illustrated in the view of FIG. 2. Arrows 40, 42 indicate the direction of movement of webs 14, 16 through apparatus 8. Arrows 44, 46, 48 indicate the directions of rotation of anvil roll 20 and rotary ultrasonic horns 24B, 24D, respectively.

First web 14 may be any of a wide variety of web materials, such as polyolefin films, porous foams, reticulated foams, apertured plastic films, or one or more layers made with natural fibers. A typical first web 14 may be a thin plastic film or other flexible liquid-impermeable material. For example, first web 14 can be a polyethylene film having a thickness of from about 0.012 millimeter to about 0.051 millimeter.

When it is desirable that web 14 have a more cloth-like feeling, the web may comprise a polyethylene film laminated to a nonwoven web, such as a spunbonded web of polyolefin fibers. Thus, web 14 may comprise a polyethylene film having a thickness of about 0.015 millimeter having thermally or otherwise laminated thereto a spunbonded web of polyolefin fibers having a thickness from 1.5 to 2.5 denier per filament, which nonwoven web has a basis weight of about 24 grams per square meter.

Various woven and nonwoven fabrics can be used for web 14. For example, web 14 may be composed of a meltblown or spunbonded web of polyolefin fibers. Web 14 may also comprise a carded and/or bonded web composed of natural and/or synthetic fibers. Further, web 14 can be formed of a woven or nonwoven fibrous web which has been constructed or treated, in whole or in part, to impart a desired level of liquid impermeability to selected regions of the web.

Web 14 may be composed of a substantially hydrophobic material wherein the hydrophobic material is treated with a surfactant or otherwise processed to impart a desired level of wetability and hydrophilicity. Still further, first web 14 may optionally be composed of a micro-porous material which permits vapors to escape through the web while preventing liquid from passing through the web.

Web 14 can also comprise wood or cotton fibers. Other materials are synthetic fibers, such as polyester or polypropylene fibers, or a combination of natural and synthetic fibers. Web 14 can comprise a single layer, or may comprise a multiplicity of components, layers, or partial layers, which correspond to any of the materials disclosed herein, as well as others known in the art.

In a particular embodiment of the present invention, web 14 may comprise a spunbonded polypropylene fabric composed of about 2.8–3.2 denier fibers formed into a web having a basis weight of about 22 grams per square meter and a density of about 0.06 grams per cubic centimeter. A preferred such fabric may be treated with about 0.3 weight percent of a surfactant.

Web 16 can be made from any of the materials disclosed for web 14. Further, web 16 can be made from other materials, such as elastomers, not specifically disclosed for web 14.

In the embodiment shown in FIG. 1, the width of web 16 is less than the width of web 14. A turning roll or other apparatus (not shown) brings web 16 into surface-to-surface relationship with first web 14.

Anvil roll 20 is supported by first and second anvil supports 33A, 33B and shaft 50. Anvil supports 33A, 33B support anvil roll 20 from base plate 34. Shaft 50 generally is metal, such as steel, or other material having suitable structural properties.

Figure 3:
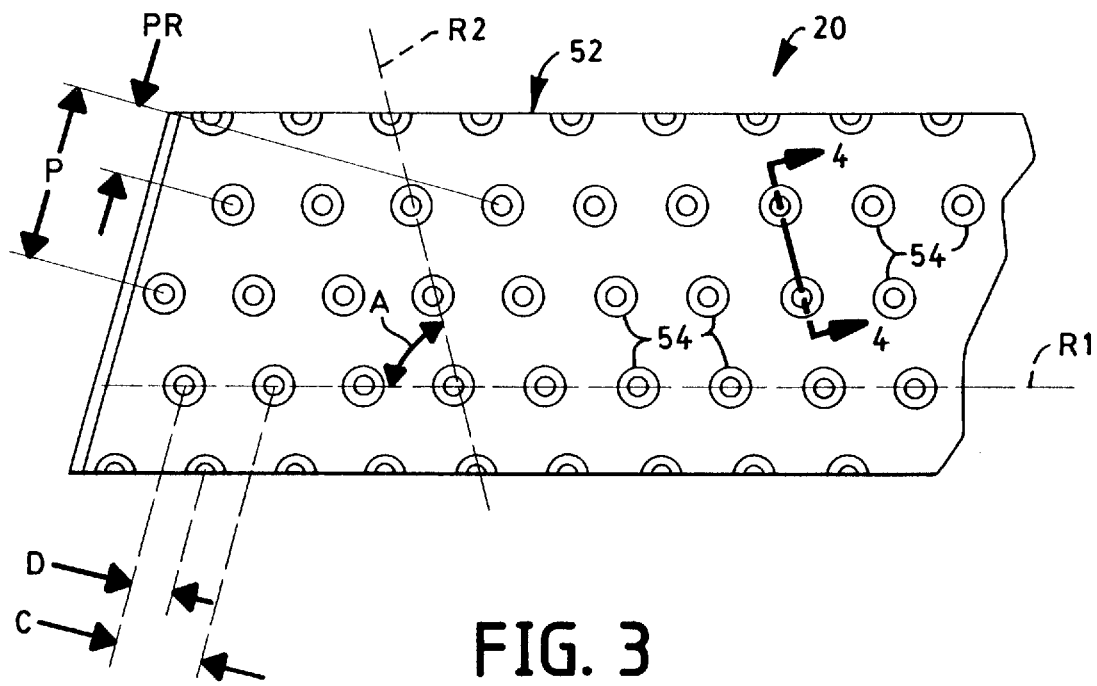
FIG. 3 shows an enlarged planar representation of a portion of the outer surface of the anvil roll of FIG. 1.

FIG. 3 shows a planar representation of a portion of the outer surface of exemplary anvil roll 20. The outer surface of the roll includes a base surface portion 52, and multiple pin elements 54 extending upwardly from base surface portion 52. Pin elements 54 are arranged in an exemplary pattern of rows "R1" of raised pin elements 54 extending along the length of anvil roll 20 and corresponding rows "R2" extending across the width of anvil roll 20 at an angle "A" of about 75 degrees with respect to rows "R1." The centers of individual raised pin elements in a given row "R1" are spaced from each other by a distance "C," measured at the reverse angle as shown, of about 0.170 inch. As illustrated in FIG. 3, pins in adjacent rows can be offset from each other a distance "D" of about 0.087 inch. In a preferred embodiment, the repeat pattern "P" for the center of a row of raised pin elements 54 is about 0.37 inch. The related dimension "PR" is 0.16 inch. As illustrated, pin elements 54 provide a uniform pattern of localized discrete bonding loci, for bonding first and second webs 14, 16 to each other.

Figure 4:
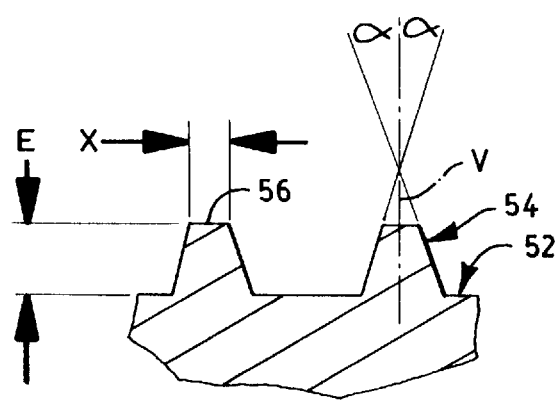
FIG. 4 shows a cross-sectional view of a portion of the surface of the anvil roll including pin elements, taken at 4—4 in FIG. 3.

FIG. 4 shows a cross-sectional view of two of pin elements 54. In the embodiment shown, pin elements 54 extend upwardly from base surface 52 of anvil roll 20 to an elevation "E" of about 0.07 inch. The substantially circular top surface 56 of each pin element 54 has a diameter "X" of about 0.04 inch. The outer generally conical surface of a given pin element 54 extends upwardly from base surface 52 toward top surface 56 at an inward angle à of about 15 degrees with respect to vertical axis "V".

While an exemplary pattern of raised discrete and localized pin elements 54 has been illustrated and described, within the outline of the area of the outer surface of roll 20 to be used in forming bonds, there is no criticality to the particular bond pattern or the structure of any raised pins or other elements. Thus, top surfaces 56 need not be circular. The spatial arrangement of pin elements 54 with respect to each other is not critical. Indeed, a pattern of raised lines may be used. Such lines may be, for example, continuous or discontinuous, crossing or non-crossing, straight or not straight.

Turning roll 12 may be driven, or may be an idler roll such that there is no direct drive of the roll. Preferably, turning roll 12 moves substantially at the same speed as first and second webs 14, 16. Second turning roll 38 can be similar or identical to turning roll 12.

Ultrasonic energy application devices 22A–22D include respective rotary ultrasonic horns 24A, 24B, 24C, 24D and ultrasonic conduit units 26A, 26B, 26C, 26D. Ultrasonic energy application devices 22A–22D can comprise, for example, devices set forth in U.S. Pat. No. 5,096,532 issued Mar. 17, 1992 to Neuwirth et al, U.S. Pat. No. 5,087,320 issued Feb. 11, 1992 to Neuwirth, or U.S. Pat. No. 5,110,403 to Ehlert issued May 5, 1992, all of which patents are hereby incorporated by reference in their entireties. In some embodiments, each ultrasonic energy application device 22A–22D applies mechanical pressure to webs 14, 16 across the width of the respective rotary ultrasonic horn 24 at a magnitude representing up to about 50 pounds per linear inch across the width of the energy-applying surface of the respective rotary ultrasonic horn. The width of each respective rotary ultrasonic horn 24 generally is about 3 inches or less. Greater widths are useful therein to the extent suitable rotary ultrasonic horns are available. In one embodiment, each ultrasonic horn 22 can apply about 800 Watts of energy.

The mechanical pressure applied to webs 14, 16, the speed of the webs, the power supplied by ultrasonic horn 24, and the material of the webs being worked have an effect on the final product that is made. For example, increasing the speed of travel of the webs requires increased mechanical pressure and/or increased ultrasonic energy to perform bonding in the shorter time period the webs are being worked by ultrasonic horn 24. Therefore, the values for the mechanical pressure applied to the webs and the ultrasonic energy applied by ultrasonic horn 24 can vary beyond the ranges or values disclosed earlier, depending on the material being worked and the speed of the webs.

Mounting brackets 30A–30D can be pillow blocks or other well known support elements securing respective ultrasonic energy application devices 22A–22D to supports 32A–32D. Base plate 34 provides a mounting base for supports 32A–32D. Base plate 34 generally comprises a metal, such as steel. In other embodiments, base plate 34 can be replaced by the cement floor of a factory or other suitable support. Thus, base plate 34 need not be present per se in all embodiments.

First through fourth segments 36A–36D of webs 14, 16 represent respective portions of the widths of the first and second webs 14, 16. Each segment 36A–36D comprises part of the width of at least one of the respective webs and extends along substantially the entire length of the respective web. Thus the first through fourth segments 36A–36D are substantially parallel to one another. Second segment 36B is adjacent first segment 36A and third segment 36C. Third segment 36C is adjacent fourth segment 36D and, of course, second segment 36B. Segments 36A–36D may have the same width. However, ultrasonic horns having different widths with respect to each other can be utilized with the invention. Thus, the segments need not have the same width. Further, where the outermost horns 24B, 24C, which operate on segments 36A, 36D respectively, overlie any portion of web 14 which extends outwardly of web 16, the first and fourth segments of web 14 may be wider than the respective first and fourth segments of web 16.

Drive apparatus (not shown) drives shaft 50 and rotates anvil roll 20 about the shaft in the direction of arrow 44 (FIG. 2) at a speed generally corresponding to the speed at which webs 14, 16 advance through the bonding apparatus 8. Rotary ultrasonic horns 24A–24D rotate cooperatively against the outer surface of anvil roll 20, as shown by arrow 46 in FIG. 2. Rotary ultrasonic horns 24C, 24D similarly rotate in the direction shown by arrow 48.

In operation, first and second webs 14, 16 advance about turning roll 12 thence onward to anvil roll 20. Anvil roll 20 has a pattern such as the pattern illustrated in FIG. 3. First and second rotary ultrasonic horns 24A, 24B and raised pin elements 54, in combination, form nips between anvil roll 20 and the respective horns. At the nips, first and second rotary ultrasonic horns 24A, 24B ultrasonically bond first and third segments 36A, 36C of first and second webs 14, 16 to each other.

As webs 14, 16 advance past horns 24A, 24B, the ultrasonic bonding continuously produces a pattern, which may be spatially continuous (a line pattern) or discontinuous (dot pattern from pin elements 54), or a combination of continuous and discontinuous. The pattern may further be regular or irregular.

First and second rotary ultrasonic horns 24A, 24B are spaced from each other and have respective first and second axes of rotation. The second axis of rotation is substantially aligned with the first axis of rotation. The first axis of rotation is substantially perpendicular to the direction of travel of first and second webs 14, 16. First and second webs 14, 16, bonded at segments 36A, 36C are then advanced, along with corresponding rotational advance of the outer surface of anvil roll 20, about 180 degrees, to the opposite side of the anvil roll 20 to positions of third and fourth rotary ultrasonic horns 24C, 24D. See FIG. 2.

Third and fourth rotary ultrasonic horns 24C, 24D, in combination with pin elements 54 of anvil roll 20, form nips. At the nips, third and fourth rotary ultrasonic horns 24C, 24D ultrasonically bond second and fourth segments 36B, 36D of first and second webs 14, 16 to each other. Third and fourth rotary ultrasonic horns 24C, 24D are spaced from each other at third and fourth locations and have respective third and fourth axes of rotation. The third axis of rotation is substantially aligned with the fourth axis of rotation. The third axis of rotation is generally substantially perpendicular to the direction of travel of first and second webs 14, 16. Third and fourth rotary ultrasonic horns 24C, 24D can continuously produce a pattern of bonds bonding the first and second webs to each other. The pattern may be spatially continuous or discontinuous, and otherwise as described with respect to the first and second horns.

Composite web 10 and, of course, first and second webs 14, 16, can be drawn through ultrasonic bonding apparatus 8 at a speed of at least about 600 feet/minute, preferably at least about 1000 feet/minute. Anvil roll 20 is preferably driven to promote common registration of webs 14, 16 to both sets of horns 24A, 24B and 24C, 24D, as well as to generally promote movement of webs 14, 16 therethrough. Turning roll 38 turns composite web 10 and the web advances beyond ultrasonic bonding apparatus 8 for further processing or storage on a wind-up roll (not shown). Formation of composite web 10 is accompanied by ultrasonic bonding of preferably the first through fourth segments 36A–36D on each of webs 14, 16. In some embodiments, less than all segments may be bonded. However, bonding at all segments is preferred.

By utilizing a single anvil roll 20, turning at a surface speed corresponding to the speed of advance of webs 14, 16 through apparatus 8, registration established between webs 14, 16 and anvil roll at horns 24A, 24B is maintained at least until webs 14, 16 have advanced past horns 24C, 24D. This better control and registration is especially noticeable when compared to multiple bonders using multiple anvils to create a single bond pattern. Thus, the registration of bond points of first and second webs 14, 16, as created by pin elements 54, is more precise since all of the ultrasonic bonding occurs on single anvil roll 20 while webs 14, 16 remain stationary with respect to the outer surface of the anvil roll.

FULL WIDTH BONDING

In some embodiments, the entire full widths of webs 14, 16 can be bonded together at selected locations, as shown in FIG. 1, to form composite web 10. As used herein, "full width" of the webs means at least 80% and preferably up to 100% of the overall width of the narrower of webs 14, 16. Full width bonding preferably bonds the outer edge of a narrower web to the facing surface of the corresponding wider web. "Full width bonding" expresses overall width of the area generally bonded, irrespective of the bond pattern used. Full width bonding does comprehend the pattern of discrete points illustrated in FIG. 3. Thus, full width bonding can be accomplished by ultrasonic bonding of a pattern across and along the width of the web. For example, the pattern of bonds suggested by FIGS. 3 and 4 can be used for full width bonding to the extent the pattern of dot bonds extends the "full width" of the respective web.

FIG. 1 shows an example of full width bonding at composite web 10. First, second, third and fourth rotary ultrasonic horns 22A–22D are configured and spaced across the widths of webs 14, 16 at the respective first through fourth locations in a staggered arrangement such that no substantial areas of webs 14, 16 receive bonding energy from two or more of the ultrasonic horns. Thus, first through fourth ultrasonic horns are staggered or spaced apart along the longitudinal orientation of webs 14, 16, so that substantially no surface contacted by one of the rotary ultrasonic horns is contacted by another ultrasonic horn. As used herein, "staggered" means being spaced apart in the direction of movement of the webs being worked as well as spaced transverse to the length of the web being worked, such that a surface of a web already worked by an upstream rotary ultrasonic horn is not contacted by, or receives only minimal contact from, a downstream rotary ultrasonic horn. However, close abutment of the areas worked by the upstream and downstream horns is preferred, and some inadvertent overlap may thus occur. In this manner, the entire transverse common width of the first and second webs 14, 16, and optionally the entire width of web 14, can be bonded.

Where the full widths of two webs are bonded to each other as illustrated in FIG. 1, construction adhesives normally used to bond such webs can be eliminated, with corresponding cost savings.

Referring again to FIG. 1, the bonding referred to has been described in terms of bonding webs 14, 16 to each other (interweb bonding). In addition, where one or both of webs 14, 16 are comprised of non-sheet elements (e.g. fibers), the bonding includes consolidation to each other of adjacent fibers within each web (intraweb bonding). Especially where one or both webs comprise non-sheet elements, bonding typically includes both interweb and intraweb bonding. Any bonding of web 14 outside the width of web 16 is, of course, intraweb bonding.

MULTIPLE-STAGE COMBINING

Figure 5:
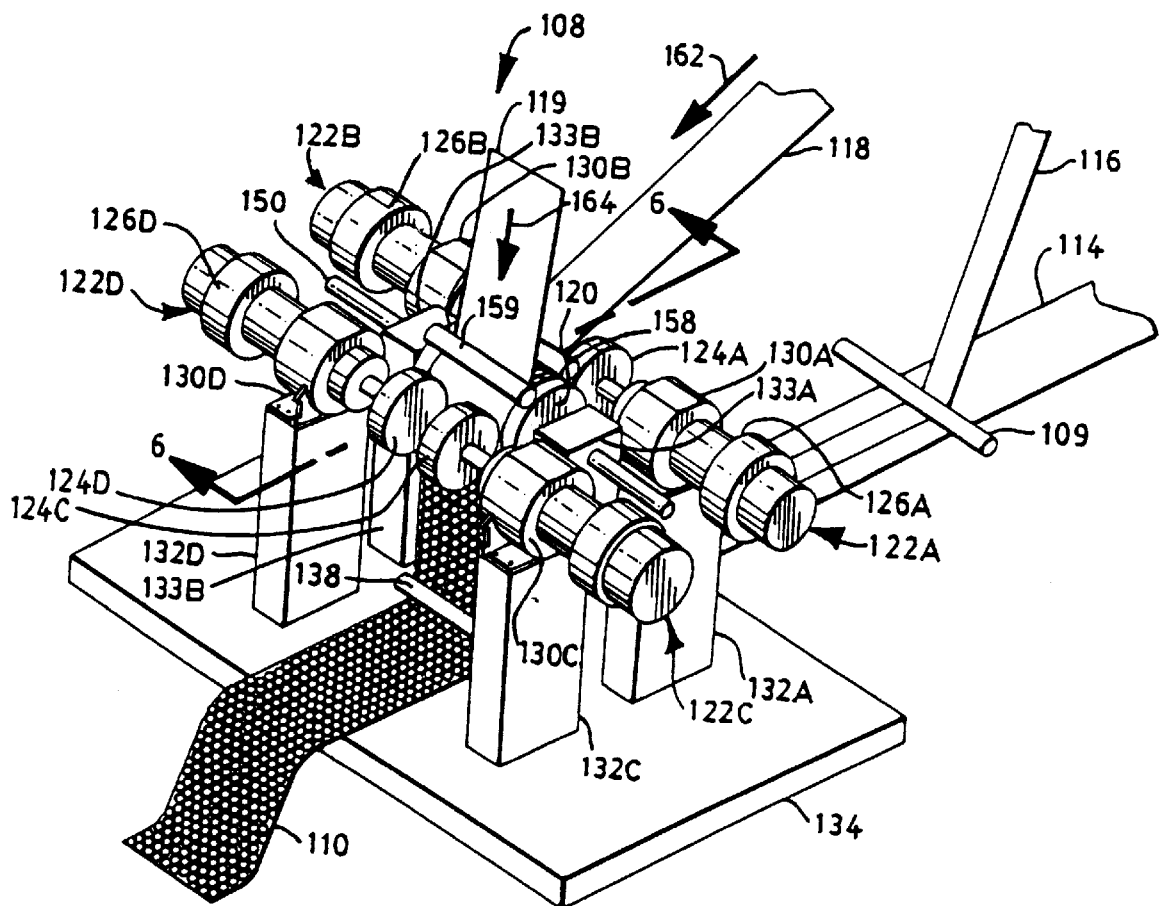
FIG. 5 shows a pictorial view of a second embodiment of apparatus of the invention.

FIG. 5 illustrates another family of embodiments of apparatus 108 of the invention wherein the prefix "1" indicates the instant embodiment. Second and third digits are used in common with the earlier embodiment. Apparatus 108 for fabricating composite web 110 includes turning roll 109. Turning roll 109 disposes first web 114 and second web 116 into surface-to-surface relationship with each other. Webs 114, 116 are drawn over anvil roll 20, about second turning roll 112 and anvil roll 120 as in the first embodiment.

Ultrasonic energy application devices 122A, 122B, 122C and 122D are positioned at first and second angular orientations about the circumference of anvil roll 120. Ultrasonic energy application devices 122A–122D include respective rotary ultrasonic horns 124A, 124B, 124C, 124D and ultrasonic conduit units 126A, 126B, 126C, 126D. Respective mounting brackets 130A, 130B, 130C, 130D secure respective ultrasonic energy application devices 122A–122D to supports 132A, 132B (not shown), 132C, 132D. Supports 132A–132D are secured to base plate 134. Mounting brackets 130A–130D bracket and secure ultrasonic energy application devices 122A–122D to respective supports 132A–132D. Anvil roll supports 133A, 133B support anvil roll 120 between the respective ultrasonic energy application devices.

Additional third web 118 and fourth web 119 are disposed in surface-to-surface relationship with first and second webs 114, 116 by respective fixedly mounted turning rolls 158, 159 disposed downstream of ultrasonic energy application devices 122A, 122B. Third web 118 and fourth web 119 travel toward anvil roll 120 in the respective directions shown by arrows 162, 164. Third and fourth webs 118, 119 thus come into facing relationship with webs 114, 116 after first and second ultrasonic energy application devices 122A, 122B, in combination with anvil roll 120, apply ultrasonic energy to first and second webs 114, 116 at the first and second locations.

The ultrasonic energy applied preferably forms ultrasonic bonds between webs 114, 116 in segments defined by respective widths of webs 114, 116. Third web 118 is drawn about turning roll 158 and into surface-to-surface relationship with first and second webs 114, 116. At a further downstream location about the circumference of anvil roll 120, fourth web 119 is drawn about turning roll 159 and into surface-to-surface relationship with third web 118 and, if web 119 is wider than web 118, then also potentially into contact with web 114, optionally web 116. Third and fourth webs 118, 119 generally are drawn across anvil roll 120 at substantially the same speed as first and second webs 114, 116. Any portions of first and second webs 114, 116 not covered by third web 118 can thus be in surface-to-surface relationship with fourth web 119. The first through fourth webs thus advance together toward third and fourth ultrasonic energy application devices 122C, 122D. Third and fourth ultrasonic energy application devices 122C, 122D apply ultrasonic energy at third and fourth locations to respective segments of the first through fourth webs to form composite web 110. Composite web 110 then advances about turning roll 138 and downstream, for further processing, or for usage as a finished product.

Figure 6:
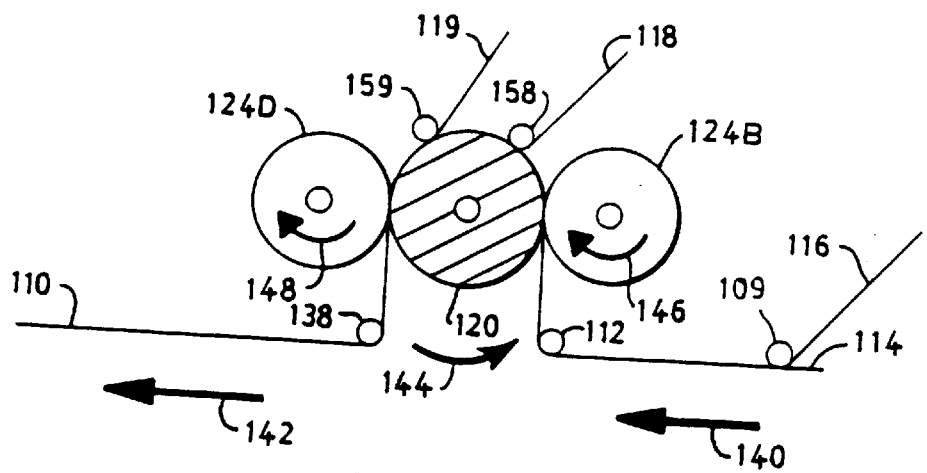
FIG. 6 shows a cross-section of the anvil roll, and associated rotary ultrasonic horns, taken at 6—6 in FIG. 5.

The cross-sectional view of FIG. 6 shows the arrangement between anvil roll 120 and second and fourth rotary ultrasonic horns 124B, 124D. For purposes of illustration, certain elements, such as supports 132A–132D, are not illustrated in the view of FIG. 6. Arrows 140, 142 indicate the direction of movement of the webs through apparatus 108. Arrows 144, 146, 148 indicate the direction of rotation of anvil roll 120 and second and fourth rotary ultrasonic horns 124B, 124D, respectively.

First web 114, second web 116, third web 118, and fourth web 119 can all comprise the same or similar materials, or other unrelated materials as disclosed earlier with respect to first and second webs 14, 16. Thus some or all of the first through fourth webs can be made of different materials.

Anvil roll 120, first and second anvil supports 133A, 133B, base plate 134, supports 132A–132D, mounting brackets 130A–130D and the like generally comprise metal, such as steel. Anvil roll 120 can have thereon the pattern of pin elements shown in FIGS. 3–4, or any other suitable pattern, to bond the webs to each other. The embodiment of FIGS. 5 and 6 preferably has a drive apparatus as disclosed with respect to the embodiment of FIGS. 1 and 2.

In operation, anvil roll 120 rotates on shaft 150, turning with the advance of first and second webs 114, 116 about turning roll 112. As in FIG. 1, first and second ultrasonic horns 124A, 124B ultrasonically bond respective first and second segments of the first and second webs to each other. Turning roll 158 places third web 118 in surface-to-surface relationship with first and second webs 114, 116 on anvil roll 120. Turning roll 158 can be disposed about 45 degrees about the axis of rotation of anvil roll 120 with respect to the nips formed between first and second rotary ultrasonic horns 124A, 124B and the anvil roll.

About another 90 degrees downstream on anvil roll 120, but before the third and fourth rotary ultrasonic horns, turning roll 159 places fourth web 119 in surface-to-surface relationship with third web 118 and potentially in surface-to-surface relationship with portions of first and second webs 114, 116 not covered by the third web. Third and fourth rotary ultrasonic horns 124C, 124D, in combination with anvil roll 120, form nips. At the nips, third and fourth rotary ultrasonic horns 124C, 124D ultrasonically bond segments of the third and fourth webs to each other and to the first and second webs, to finish forming composite web 110. At least one of the segments bonded at downstream horns 124C, 124D can overlap with at least one of the segments previously bonded by upstream rotary ultrasonic horns 124A, 124B. As used herein, "overlapping" means that a portion across the width of the segment bonded by third and fourth rotary ultrasonic horns 124C, 124D, has previously been bonded by one of first and second rotary ultrasonic horns 124A, 124B. Thus at least part of a previously bonded segment can be, but need not be, "repeat bonded" in forming composite web 110. Turning roll 138 turns composite web 110 and the web advances for further processing, or storage on a wind-up roll (not shown) or the like.

TABLE ARRANGEMENT

Figure 7:
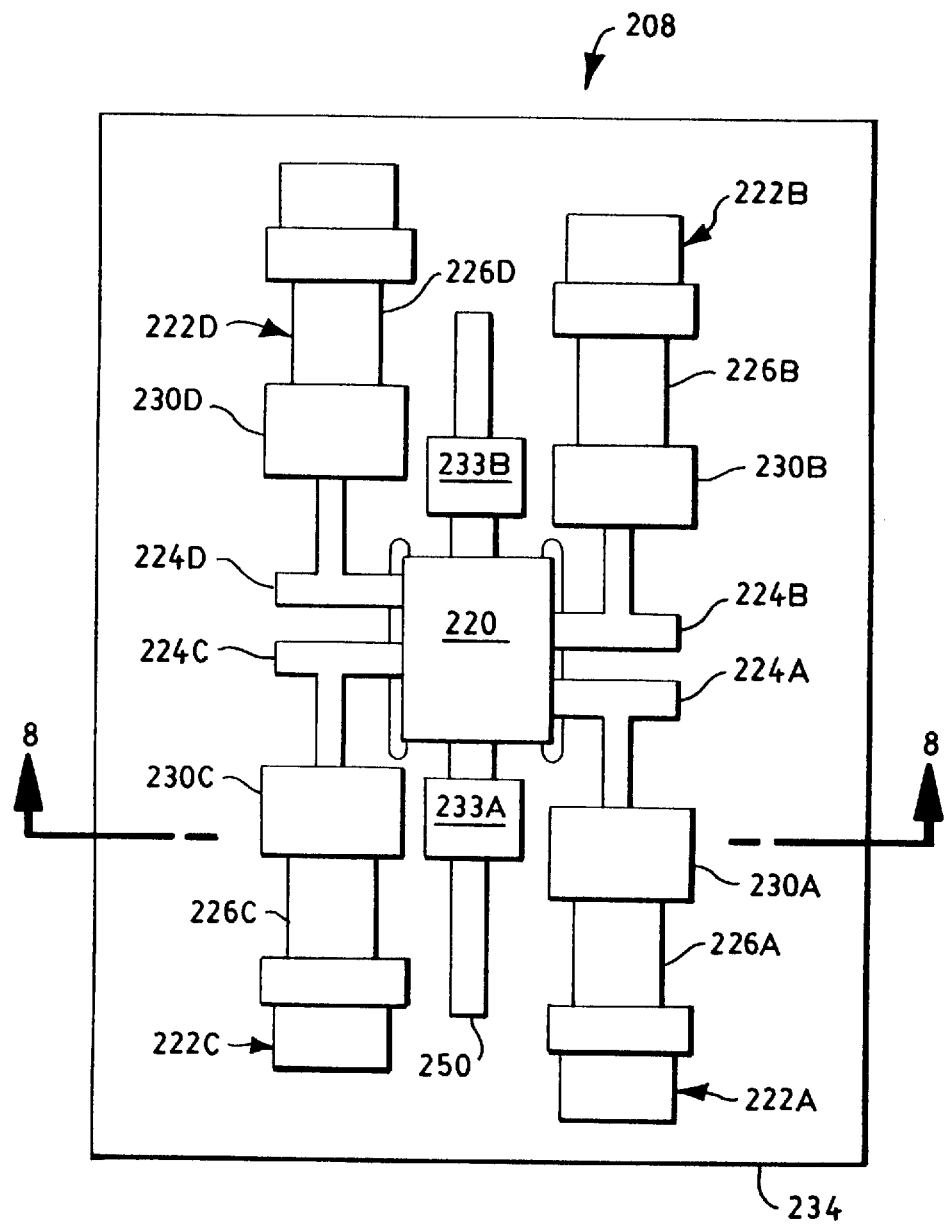
FIG. 7 shows a representative top view of a third embodiment of apparatus of the invention.
Figure 9:
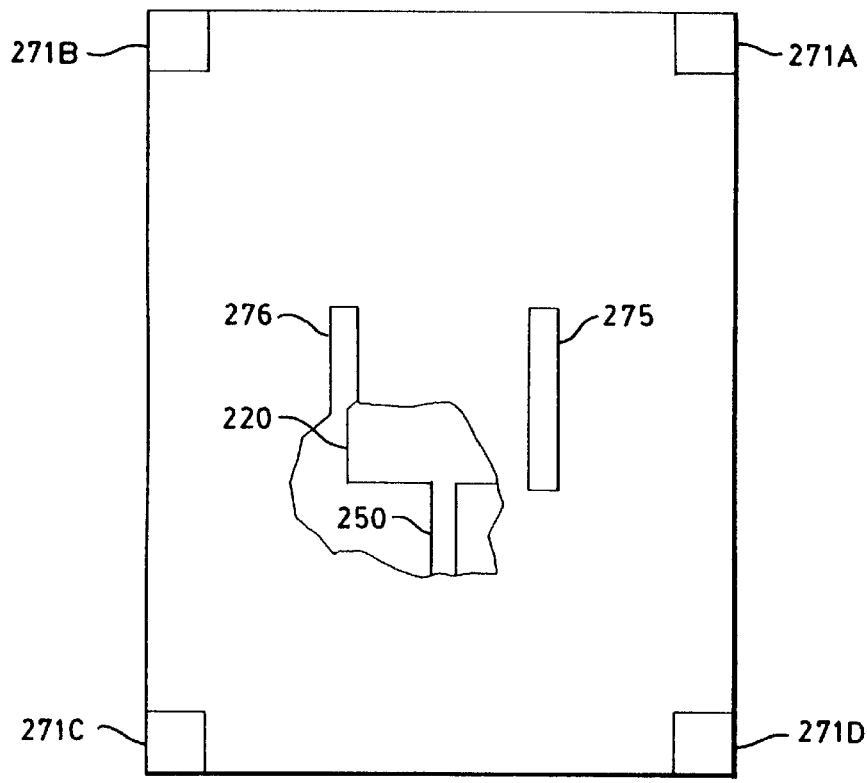
FIG. 9 is a bottom view, taken at 9—9 of FIG. 8.
Figure 8:
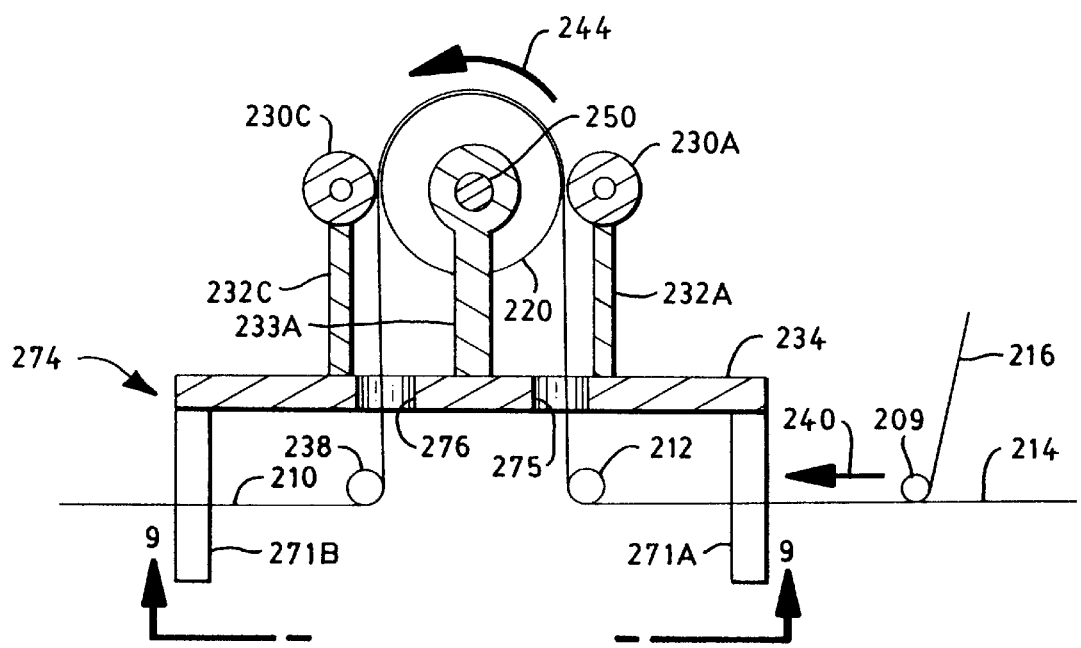
FIG. 8 shows a cross-sectional view of the apparatus of FIG. 7, taken at 8—8 in FIG. 7.

FIGS. 7–9 illustrate another family of embodiments of apparatus 8 of the invention wherein the prefix "2" indicates this family of embodiments. Second and third digits are used in common with the earlier embodiments. FIG. 7 shows, in plan view, apparatus 208 similar to apparatus 8 shown in FIG. 1. For purpose of illustration, FIG. 7 does not show any webs, only the apparatus. The arrangement of ultrasonic energy application devices 222A, 222B, 222C, 222D with respect to anvil roll 220 is generally the same as the arrangement in the embodiment of FIG. 1. The ultrasonic energy application devices include respective rotary ultrasonic horns 224A–224D and respective ultrasonic conduit units 226A–226D. Mounting brackets 230A–230D mount respective ultrasonic energy application devices 222A–222D onto supports 232A, 232B (not shown), 232C, 232D (not shown). Supports 232A–232D (See FIG. 8) are the same as the supports shown in FIG. 1. Anvil roll supports 233A, 233B at opposing ends of anvil roll 220 support the anvil roll on shaft 250. Supports 232A–232D and 233A, 233B generally are fixed to base plate 234.

As shown in FIG. 9, first and second apertures 275, 276 are generally configured as slots which extend substantially the entire width of anvil roll 220. Further, the slots of apertures 275, 276 shown in FIG. 9 are generally parallel to (i) the portion of the outer surface of turning roll 212 which is closest to turning roll 238 and (ii) the portion of the outer surface of anvil roll 210 which is closest to rotary ultrasonic horns 224A, 224B, and the above outer portions (i) and (ii) in combination, define a plane which passes through aperture 275, preferably centered on aperture 275 as shown. A similar arrangement exists between the outer surface of anvil roll 220 adjacent ultrasonic horns 224C, 224D, and turning roll 238.

As shown in the cross-sectional view of FIG. 8, first web 214 and second web 216 are drawn into surface-to-surface relationship with each other at turning roll 209. Thus, in this embodiment, base plate 234 forms the top of table unit 274. Support legs 271A, 271B 271C, 271D support base plate 234. In combination, support legs 271A–271D and base plate 234 form table unit 274. Thus, as shown in FIG. 8, first and second webs 214, 216 are drawn along a path below base plate 234 around turning roll 212 and toward anvil roll 220. The respective webs pass through aperture 275 toward anvil roll 220. As described earlier, first and second ultrasonic energy application devices 222A, 222B, in combination with anvil roll 220, apply ultrasonic energy to bond e.g. first and third segments of first and second webs 214, 216. Third and fourth ultrasonic energy application devices 222C, 222D ultrasonically bond e.g. second and fourth segments of the webs. After ultrasonic bonding is completed, composite web 210 passes through 210 out the opposing side of table unit 274. Drawing apparatus (not shown) draws composite web 210 downstream for further processing or storage on a wind-up roll or the like.

MULTIPLE EFFECT BONDING OF WEBS

Figure 10:
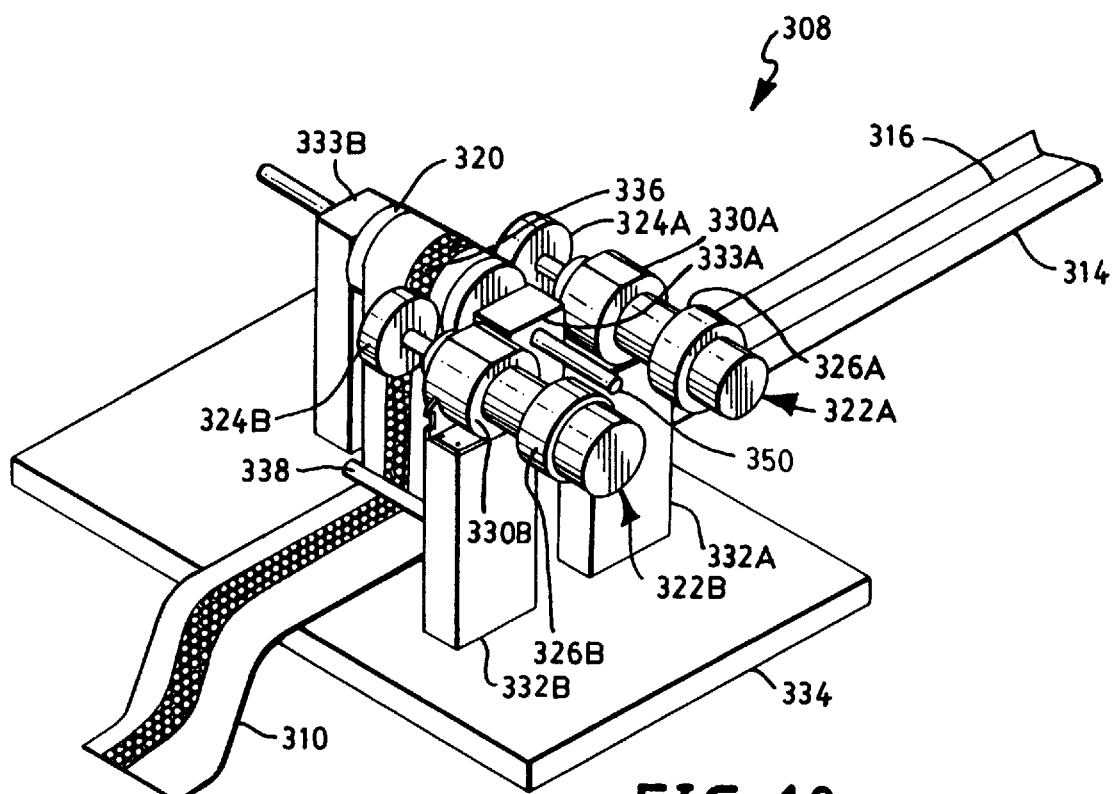
FIG. 10 is a pictorial view of a fourth embodiment of ultrasonic bonding apparatus of the invention.
Figure 11:
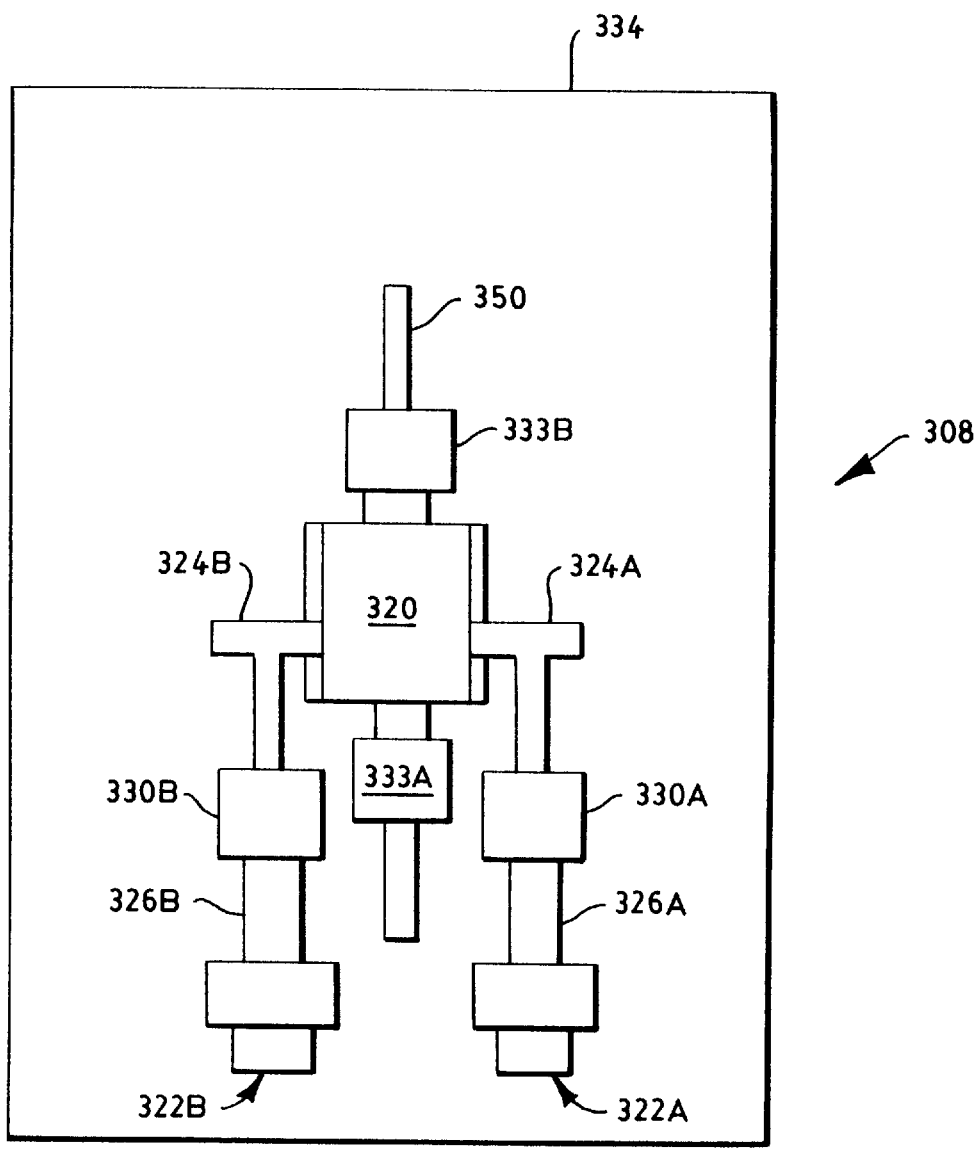
FIG. 11 is a representative top view of the apparatus in FIG. 10 without the webs.

FIGS. 10 and 11 illustrate yet another family of embodiments of apparatus 8 of the invention wherein the prefix "3" indicates this family of embodiments. Second and third digits are used in common with the earlier embodiments. FIG. 10 shows ultrasonic bonding apparatus 308 for fabricating composite web 310 similar to apparatus 8 shown in FIG. 1 except only two rotary ultrasonic horns 324A, 324B are present. Ultrasonic horns 324A, 324B are substantially in alignment with each other across first and second webs 314, 316. The top view of FIG. 11 shows ultrasonic bonding apparatus 308 having first and second rotary ultrasonic horns 324A, 324B aligned across the width of anvil roll 320. No webs are shown in FIG. 11.

Returning now to FIG. 10, webs 314 and 316 are disposed in surface-to-surface relationship with each other. Webs 14, 16 are drawn about a turning roll (not shown) toward the anvil roll.

Ultrasonic bonding apparatus 308 includes ultrasonic energy application devices 322A, 322B spaced about the circumference of anvil roll 320 (e.g. 180 degrees apart). Ultrasonic energy application devices 322A, 322B include respective rotary ultrasonic horns 324A, 324B and ultrasonic conduit units 326A, 326B. Respective mounting brackets 330A, 330B secure ultrasonic energy application devices 322A, 322B to supports 332A, 332B. Supports 332A, 332B are secured to base plate 334. Mounting brackets 330A, 330B secure ultrasonic energy application devices 322A, 322B to first and second supports 332A, 332B. Supports 333A, 333B support anvil roll 320, positioned between the respective ultrasonic energy application devices.

First and second ultrasonic energy application devices 322A, 322B, in combination with anvil roll 320, apply ultrasonic energy to first and second webs 314, 316 at first and second locations spaced about the circumference of the anvil roll. The ultrasonic energy applied has a first effect at first bond loci in segment 336 of first and second webs 314, 316. This first effect can include bonding of the first and second webs 314, 316 to each other (interweb bonding) as well as bonding together fibers or the like within a given one of the webs (intraweb bonding). Rotation of anvil roll 320 carries webs 314, 316 toward second ultrasonic energy application device 322B. Second ultrasonic horn 324B applies ultrasonic energy to segment 336 in registration, and at the same bond loci, as the energy applied by first ultrasonic horn 324A. This second application of energy to the same loci has a second effect on segment 336. The second effect can include substantially bonding the first and second webs to each other at segment 336 to form composite web 310 (interweb bonding), as well as intraweb bonding. Composite web 310 then advances about turning roll 338 and downstream for further processing, or usage as a finished product.

The above method of multiple effect bonding can be applied to consolidating a batt of ultrasonically fusible fibers to make a consolidated web. Referring generally to FIGS. 10 and 11, but in application to a loose, generally unconsolidated batt or mat of fibers, such method includes feeding the batt or mat of fibers in a feed direction into operative engagement with anvil roll 320. The batt or mat is, of course, provided with suitable preliminary consolidation so that the batt or mat can be fed over anvil roll 320. First rotary ultrasonic horn 324A applies ultrasonic energy to superposed ones of the fibers at the nip formed between ultrasonic horn 324A and anvil roll 320. Subsequently, second rotary ultrasonic horn 324B applies ultrasonic energy to the superposed fibers in registry with the first application of ultrasonic energy at horn 324A.

Thus, second ultrasonic horn 324B applies energy to locations/spots, etc. on the batt or mat which have already received a first application of ultrasonic energy by the first horn 324A. Thus, the second horn applies a second treatment of energy to locations on the batt which earlier received energy from horn 324A. The net result of the second applications of energy to locations on the batt which earlier received first applications is that enhanced consolidation of the batt can be achieved, or a given level of consolidation can be achieved at greater operating speeds, namely greater web speeds of the web traversing anvil roll 320.

Accordingly, the consolidation operation can be performed in a single effect bonding as in e.g. FIGS. 1–2, albeit at slower speeds of advance of the batt or mat or web.

FIG. 11 shows the alignment of rotary ultrasonic horns 324A, 324B about the circumference of anvil 320. Rotary ultrasonic horns 324A, 324B are arranged to bond respective webs 314, 316 across a common width of segment 336. This multiple effect bonding of a given width of webs 314, 316 can increase the overall bond strength of composite web 310 as well as provide for enhanced process operating speed.

Further, third and fourth ultrasonic horns (not shown) can be arranged in substantial upstream-downstream alignment with each other on anvil roll 320, and beside the respective first and second ultrasonic horns. Thus, as first and second webs 314, 316 are bonded at a common segment by first and second ultrasonic horns 324A, 324B, other ultrasonic horns (not shown) can similarly bond second, third, fourth, etc. segments of the webs. In such scenario, each respective segment of the webs can receive multiple applications (at least two) of ultrasonic energy, preferably while maintaining registry on a single anvil, with a short interval between the bondings.

Typically, the interval is sufficiently short that at least some of the thermal energy created at the first application of ultrasonic energy remains present undissipated in the web(s) when the subsequent application of ultrasonic energy is applied. Thus, the web(s) are e.g. still warm from an earlier application of energy when a subsequent application of energy is applied, whereby the combined applications of energy work together in creating the final bonding. Thus, the first application of energy can make a first change in the materials due to the heat, pressure and energy involved. The second application of energy at the same locations in the webs can further change the materials of webs 314, 316.

Multiple bonding of the webs can allow the equipment to operate at faster speeds than would be possible with a single application of energy. As contemplated herein, the webs may not be firmly bonded to each other at the first ultrasonic horn. Rather, bonding develops sequentially as the respective horns apply energy multiple times to the respective bond loci. Thus, the webs, can advance at speeds faster than those previously known for ultrasonic bonding. For example, ultrasonic bonding apparatus 308 can operate at web speeds greater than 600 feet/minute, greater than 1000 feet per minute, and even greater than 1300 feet per minute, because multiple bonding hits on a given bond locus can, in combination, provide sufficient effective contact time for ultrasonic bonding when operating at such a high speed and with subsequent bonding hits occurring before dissipation of latent energy applied in an earlier hit.

A critical characteristic of this embodiment is multiple applications of ultrasonic energy top any given bond locus on the web. Thus, the second hit of bonding energy is applied to bond loci that have already received a first application of ultrasonic energy. To that end, maintaining registration of the bond loci at the first application of energy with the bond loci at the second application of energy, such that the first and second bond loci are at identical locations on the web, is an important feature of this embodiment. Accordingly, at least some of the first and second bond loci will overlap each other.

By providing a sufficient number of additional ultrasonic horns, spaced across the widths of the webs, multiple ultrasonic bonding can occur across the full widths of webs 314, 316. In addition, speeds can be further increased by providing additional ultrasonic horns, aligned with each other and with the respective segments, and thus additional applications of energy within the critical timing wherein subsequent applications build on energy applied by upstream horns.

OTHER VARIATIONS

In some embodiments, additional ultrasonic energy application devices (not shown) may be disposed and arranged about anvil roll 20, as necessary, to ultrasonically bond the first and second webs across substantially the entire width of the webs.

Additional ultrasonic energy application devices can also be utilized to secure any number of webs to each other. For example, while FIG. 1 shows first and second webs 14, 16 being disposed in surface-to-surface relationship with each other before ultrasonic bonding occurs, three or more webs can be disposed in contact with each other before reaching anvil roll 20.

Ultrasonic bonding apparatus 208 of FIGS. 7–9 can also be arranged to bond the center of a wide web by having the apertures in base plate 234 formed in table top 234. Thus ultrasonic energy application devices can be mounted such that the mounting locus is within the projected width of webs 214, 216.

In some embodiments of the invention, mounting brackets 30A–30D can be formed as integral parts of supports 32A–32D. In some embodiments of the invention, anvil roll supports 33A, 33B can be integral with base plate 34 or supports 32A–32D. In some embodiments of the invention, base plate 34 can be replaced by earth, e.g. the factory floor supporting ultrasonic bonding apparatus 8.

Raised pin elements 54 can have various shapes, sizes, and spacing arrangements. For instance, individual raised elements 54 can have a rectangular shape, star shape or any other shape. The spacing between raised pin elements 54 can be varied as desired for the degree of securement needed for first and second webs 14, 16 to each other. Rows of pin elements 54 can be replaced with decorative patterns or other designs for raised elements at selected portions of anvil roll 20.

Variations described with respect to any one embodiment of the invention can be utilized by any other embodiment of the invention. For example, the raised pin elements 54 or any variation of the embodiment of FIG. 1 can be utilized in all of the other embodiments as the pattern for the anvil roll.

Methods and apparatus described herein can be used to consolidate a batt of ultrasonically fusible fibers into a web. The apparatus can be as illustrated above. A typical method includes feeding the batt of fibers in a feed direction into operative engagement with anvil roll 20. Referring generally to the apparatus illustrated in FIG. 1, but wherein the apparatus is operating on a fibrous batt rather than on two previously consolidated webs, ultrasonic horns 24A and 24B bond superposed ones of fibers in first segment 36A of the batt to each other, at a first nip formed between horn 24A and anvil roll 20, and ultrasonically bond superposed ones of fibers in third segment 36C to each other, at a second nip formed between horn 24B and anvil roll 20. The second nip is disposed at the same angular orientation with respect to the anvil roll as the first nip, as illustrated in the drawings. The method further comprises ultrasonically bonding superposed ones of fibers in the second segment 36B to each other, at a third nip formed between horn 24D and anvil roll 20. The third nip is disposed at an angular orientation, displaced about the anvil roll from the first and second nips. A fourth bonding nip may also be used as illustrated at horn 24C.

Those skilled in the art will now see that certain modifications can be made to the invention herein disclosed with respect to the illustrated embodiments, without departing from the spirit of the instant invention. And while the invention has been described above with respect to the preferred embodiments, it will be understood that the invention is adapted to numerous rearrangements, modifications, and alterations, all such arrangements, modifications, and alterations are intended to be within the scope of the appended claims.

Having thus described the invention, what is claimed is:

1. A method of fabricating a composite web having a length and a width, the method comprising the steps of:

(a) disposing first and second webs in surface-to-surface relationship with each other, each web comprising first, second, third and fourth segments, each segment of each web comprising a separate and distinct part of the width of the respective web, and extending along substantially the entire length of the respective web, the first, second, third and fourth segments in each web being substantially parallel with respect to each other, the second segment in each web being between the first and third segments in the respective web, the third segment in each web being between the second and fourth segments in the respective web, like numbered segments of the respective webs being in surface-to-surface relationship with each other;

(b) bringing the first and second webs into alignment with an anvil roll;

(c) using first and second rotary ultrasonic horns, ultrasonically bonding the first segment of the first web to the first segment of the second web, on the anvil roll at a first location between the rotary anvil roll and the first rotary ultrasonic horn, and bonding the third segment of the first web to the third segment of the second web at a second location angularly spaced about an axis of the anvil roll from the first location, the first rotary ultrasonic horn having a first axis of rotation that is substantially perpendicular to the direction of travel of the first and second webs; and (d) using third and fourth rotary ultrasonic horns, ultrasonically bonding the second segment of the first web to the second segment of the second web, on the anvil roll at a third location, and bonding the fourth segment of the first web to the fourth segment of the second web at a fourth location on the anvil roll spaced from the third location, the third and fourth locations being spaced about the circumference of the anvil roll from the first and second locations, the ultrasonic bonding thus bonding the first and second webs to each other at the first, second, third and fourth segments, and thereby forming the composite web.

2. A method as in claim 1, wherein the first, second, third and fourth segments in each of the first and second webs, in combination, comprise substantially the entire widths of the respective webs, and wherein a first width of the first web is substantially the same as a second width of the second web.

3. A method of fabricating a composite web having a length and a width, the method comprising the steps of:

(a) disposing first and second webs in surface-to-surface relationship with each other, each web comprising first, second, third and fourth segments, each segment of each web comprising a separate and distinct part of the width of the respective web, and extending along substantially the entire length of the respective web, the first, second, third and fourth segments in each web being substantially parallel with respect to each other, the second segment in each web being between the first and third segments in the respective web, the third segment in each web being between the second and fourth segments in the respective web, like numbered segments of the respective webs being in surface-to-surface relationship with each other;

(b) bringing the first and second webs into alignment with an anvil roll;

(c) using first and second rotary ultrasonic horns, ultrasonically bonding the first segment of the first web to the first segment of the second web, on the anvil roll at a first location between the rotary anvil roll and the first rotary ultrasonic horn, and bonding the third segment of the first web to the third segment of the second web at a second location spaced about an axis of the anvil roll from the first location, the ultrasonic bonding at the first segment comprising the first rotary ultrasonic horn continuously bonding substantially the entire length of the first segment and the second rotary ultrasonic horn continuously bonding substantially the entire the length of the third segment; and (d) using third and fourth rotary ultrasonic horns, ultrasonically bonding the second segment of the first web to the second segment of the second web, on the anvil roll at a third location, and bonding the fourth segment of the first web to the fourth segment of the second web at a fourth location on the anvil roll spaced from the third location, the third and fourth locations being spaced about the circumference of the anvil roll from the first and second locations, the ultrasonic bonding thus bonding the first and second webs to each other at the first, second, third and fourth segments, and thereby forming the composite web.

4. A method as in claim 3, the ultrasonic bonding at the second and fourth segments comprising continuously bonding substantially the entire length of the second and fourth segments.

5. A method as in claim 1, including drawing the webs across the anvil roll and through nips defined between the anvil roll and the respective rotary ultrasonic horns at a speed of at least about 600 feet per minute.

6. A method as in claim 5, the speed comprising at least about 1000 feet per minute.

7. A method as in claim 6 including mechanically loading the respective horn and the anvil roll on the web at up to about 50 pounds of pressure per linear inch width across an energy-applying surface of the respective rotary ultrasonic horn.

8. A method as in claim 1, the first and second rotary ultrasonic horns being spaced from each others, the second rotary ultrasonic horn having a second axis of rotation, the second axis of rotation being substantially aligned with the first axis of rotation.

9. A method as in claim 8, the third and fourth rotary ultrasonic horns being spaced apart from each other and having third and fourth axes of rotation, respectively, the fourth axis of rotation being substantially aligned with the third axis of rotation, the third axis of rotation being substantially perpendicular to the direction of travel of the first and second webs.

10. A method as in claim 1, the first and second rotary ultrasonic horns being staggered with respect to the third and fourth rotary ultrasonic horns such that the first and second webs are bonded to each other over substantially the entireties of common widths thereof.

11. A method as in claim 1, the anvil roll having a pattern of raised elements on an outer circumferential surface thereof, the respective rotary ultrasonic horns and the anvil roll, in combination, bonding the first and second webs to each other at the raised elements.

12. A method as in claim 1, including disposing a third web onto at least one of the first and second webs after the ultrasonic bonding of the first and second webs to each other at the first and second locations.

13. A method as in claim 12, including the third and fourth rotary horns applying ultrasonic energy to the third web at the third and fourth locations, thereby bonding the first, second and third webs to each other.

14. A method of fabricating a composite web having a length and a width, the method comprising the steps of:

(a) disposing first and second webs in surface-to-surface relationship with each other, each web comprising first, second, third and fourth segments, each segment of each web comprising a separate and distinct part of the width of the respective web, and extending along substantially the entire length of the respective web, the first, second, third and fourth segments in each web being substantially parallel with respect to each other, the second segment in each web being between the first and third segments in the respective web, the third segment in each web being between the second and fourth segments in the respective web, like numbered segments of the respective webs being in surface-to-surface relationship with each other;

(b) bringing the first and second webs into alignment with an anvil roll;

(c) using first and second rotary ultrasonic horns, ultrasonically bonding the first segment of the first web to the first segment of the second web, on the anvil roll at a first location between the rotary anvil roll and the first rotary ultrasonic horn, and bonding the third segment of the first web to the third segment of the second web at a second location angularly spaced about an axis of the anvil roll from the first location; and (d) using third and fourth rotary ultrasonic horns, ultrasonically bonding the second segment of the first web to the second segment of the second web, on the anvil roll at a third location, and bonding the fourth segment of the first web to the fourth segment of the second web at a fourth location on the anvil roll spaced from the third location, the third and fourth locations being spaced about the circumference of the anvil roll from the first and second locations, ultrasonic bonding applied by at least one of the third and fourth ultrasonic horns overlapping with ultrasonic bonding applied by at least one of the first and second ultrasonic horns, such that at least one of the third and fourth rotary ultrasonic horns applies ultrasonic energy to previously ultrasonically bonded portions of the first and second webs;

the ultrasonic bonding thus bonding the first and second webs to each other at the first, second, third and fourth segments, and thereby forming the composite web.

15. Apparatus for constructing a composite web having a length and a width, said apparatus comprising:

(a) apparatus bringing first and second webs into surface-to-surface relationship with each other, each web comprising first, second, third and fourth segments, each segment of each web comprising a separate and distinct part of the width of the respective web, and extending along substantially the entire length of the respective web, the respective segments in each web being substantially parallel with respect to each other, like numbered segments in the respective webs being in surface-to-surface relationship with each other;

(b) an anvil roll, mounted for rotation, and for receiving thereon the first and second webs;

(c) first and second rotary ultrasonic horns disposed at first and second locations spaced from each other, and adjacent said anvil roll, said first and second rotary ultrasonic horns and said anvil roll, in combination, bonding the first segment of the first web to the first segment of the second web, and the third segment of the first web to the third segment of the second web, said first rotary horn having a first axis of rotation that is substantially perpendicular to the direction of travel of the first and second webs; and (d) third and fourth rotary ultrasonic horns disposed at third and fourth locations spaced from each other, and adjacent said anvil roll, the third and fourth locations being angularly spaced about an axis of said anvil roll from the first and second locations, said third and fourth rotary ultrasonic horns and said anvil roll, in combination, bonding the second segment of the first web to the second segment of the second web, and the fourth segment of the first web to the fourth segment of the second web.

16. Apparatus as in claim 15 wherein said first and second rotary ultrasonic horns are spaced apart from each other, said second rotary horn having a second axis of rotation, the second axis of rotation being substantially aligned with the first axis of rotation.

17. Apparatus as in claim 16 wherein said third and fourth rotary ultrasonic horns are spaced apart from each other and have respective third and fourth axes of rotation, the fourth axis of rotation being substantially aligned with the third axis of rotation, the third axis of rotation being substantially perpendicular to the direction of travel of the first and second webs.

18. Apparatus as in claim 15, including loading apparatus applying mechanical loading up to about 50 pounds of pressure per linear inch width of the respective said rotary ultrasonic horn at the respective web.

19. Apparatus as in claim 18 wherein, when at least one of said rotary ultrasonic horns is operating to apply bonding energy to the respective web, the respective said rotary ultrasonic horn applying up to about 800 Watts of energy.

20. Apparatus as in claim 15, said anvil roll facilitating registration of bond points in the third and fourth segments with bond points in the first and second segments.

21. Apparatus as in claim 15, including drawing apparatus, drawing the first and second webs through said apparatus, across said anvil roll, and thus through nips defined between said anvil roll and said ultrasonic horns, at a speed of at least about 600 feet per minute.

22. Apparatus as in claim 21, the speed being at least about 1000 feet per minute.

23. Apparatus as in claim 15, said third and fourth rotary ultrasonic horns being spaced about 180 degrees about the circumference of said anvil roll from said first and second rotary ultrasonic horns.

24. Apparatus for constructing a composite web having a length and a width, said apparatus comprising:

(a) first apparatus bringing first and second webs into surface-to-surface relationship with each other, each well comprising first, second, third and fourth segments, each segment of each web comprising a separate and distinct part of the width of the respective web, and extending along substantially the entire length of the respective web, the respective segments in each web being substantially parallel with respect to each other, like numbered segments in the respective webs being in surface-to-surface relationship with each other;

(b) an anvil roll, mounted for rotation, and for receiving thereon the first and second webs;

(c) first and second rotary ultrasonic horns disposed at first and second locations spaced from each other, and adjacent said anvil roll, said first and second rotary ultrasonic horns and said anvil roll, in combination, bonding the first segment of the first web to the first segment of the second web, and the third segment of the first web to the third segment of the second web;

(d) a second apparatus for bringing a third web into surface-to-surface relationship with at least one of the first and second webs, after the first and second webs have been ultrasonically bonded to each other by said first and second rotary ultrasonic horns; and (e) third and fourth rotary ultrasonic horns disposed at third and fourth locations spaced from each other, and adjacent said anvil roll, the third and fourth locations being angularly spaced about an axis of said anvil roll from the first and second locations.

25. Apparatus as in claim 24, said third and fourth rotary ultrasonic horns and said anvil roll, in combination, applying ultrasonic energy to the third web to thereby bond the third web to at least one of the first and second webs at at least one of the second and fourth segments.

26. Apparatus as in claim 15, said ultrasonic bonding applied by at least one of the third and fourth ultrasonic horns overlapping with ultrasonic bonding applied by at least one of the first and second ultrasonic horns, such that at least one of said third and fourth rotary ultrasonic horns applies ultrasonic energy to previously ultrasonically bonded portions of the first and second webs.

27. Apparatus as in claim 15, said anvil roll having a pattern of raised elements on an outer circumferential surface thereof, the ultrasonic bonding occurring between said rotary ultrasonic horns and said anvil roll being effected at said raised elements of said pattern.

28. A method of fabricating a composite web having a length and a width wherein first and second webs are bonded to each other over substantially the entirety of a common width, the method comprising the steps of:
   (a) disposing the first and second webs in surface-to-surface relationship with each other, each web comprising imaginary first, second, and third segments over the common width, each segment of each web comprising a separate and distinct part of the common width corresponding to the respective web, and extending along substantially the entire length of the respective web, the first, second, and third segments in each web being substantially parallel with respect to each other, the second segment in each web being between the first and third segments in the respective web, like numbered segments of the respective webs being in surface-to-surface relationship with each other;
   (b) using first and second rotary ultrasonic horns, ultrasonically bonding the first segment of the first web to the first segment of the second web, at a first location between an anvil roll and the first rotary ultrasonic horn, and bonding the third segment of the first web to the third segment of the second web at a second location spaced from the first location, the first rotary ultrasonic horn having a first axis of rotation, the first axis of rotation being substantially perpendicular to the direction of travel of the first and second webs; and
   (c) using a third rotary ultrasonic horn, ultrasonically bonding the second segment of the first web to the second segment of the second web, at a third location, the third location being spaced from the first and second locations, the first, second, and third rotary ultrasonic horns being configured and spaced across the width of the first and second webs at the respective first through third locations in a staggered arrangement, the ultrasonic bonding thus bonding the entirety of the common width of the first and second webs to each other at the first, second, and third segments, and thereby forming the composite web.

29. A method as in claim 28, the first web having a greater width than the second web, the second web being bonded across the full width thereof to the first web.

30. A method as in claim 28, the method including disposing the first and second webs on the anvil roll and bonding the first, second, and third segments of the respective webs to each other on the anvil roll.

31. A method as in claim 30, the first location being disposed at a first nip between the first ultrasonic horn and the anvil roll.

32. A method as in claim 31, the second location being disposed at a second nip between the second ultrasonic horn and the anvil roll.

33. A method as in claim 32, including loading apparatus applying mechanical loading up to about 50 pounds of pressure per linear inch width of the respective said rotary ultrasonic horn at the respective web.

34. A method as in claim 33 the anvil roll having a pattern of raised elements on an outer circumferential surface thereof, the ultrasonic bonding being effected at the raised elements of the pattern.

35. A method as in claim 30, the third location being angularly spaced about an axis of the anvil roll from the first and second locations.

36. A method as in claim 30, including drawing the webs across the anvil roll and through nips defined between the anvil roll and the respective rotary ultrasonic horns at a speed of at least about 600 feet per minute.

37. A method as in claim 28, the first and second rotary ultrasonic horns being spaced apart from each other, the second rotary ultrasonic horn having a second axis of rotation, the second axis of rotation being substantially aligned with the first axis of rotation.

38. A method as in claim 37, the third rotary ultrasonic horn having a third axis of rotation, the third axis of rotation being substantially perpendicular to the direction of travel of the first and second webs.

39. A method of fabricating a composite web having a length and a width using multiple applications of ultrasonic energy, the method comprising the steps of:
   (a) disposing first and second webs in surface-to-surface relationship with each other;
   (b) using a first rotary ultrasonic horn, applying ultrasonic energy to first bond loci on the first web and, through the first bond loci, to second bond loci on the second web, the first rotary ultrasonic horn having a first axis of rotation that is substantially perpendicular to the direction of travel of the first and second webs; and
   (c) subsequent to step (b), using a second rotary ultrasonic horn, applying ultrasonic energy to first bond loci of the first web and thereby to second bond loci of the second web, the ultrasonic energy applied by the first rotary ultrasonic horn causing a first effect in the respective webs at the first and second bond loci, the ultrasonic energy applied by the second rotary ultrasonic horn causing a second effect in the respective webs at the first and second bond loci, the combination of the first and second effects bonding the first and second webs to each other at the first and second bond loci.

40. A method as in claim 39 wherein the first effect comprises forming bonds bonding the first and second webs to each other, the bonds having first bond strengths.

41. A method as in claim 40 wherein the second effect comprises increasing the strengths of bonds formed by the first effect.

42. A method as in claim 39, wherein the first effect does not form significant bonding between the first and second webs, and wherein the second effect does form significant bonding between the first and second webs.

43. A method as in claim 39, including applying substantially equal amounts of ultrasonic energy to the first and second webs through the first and second rotary ultrasonic horns.

44. A method as in claim 39, including the step of positioning the first and second webs on an anvil roll, the anvil roll and the first and second rotary ultrasonic horns, in combination, forming first and second nips at the first and second locations, respectively, and thereby applying ultrasonic energy to the first and second webs on the anvil roll.

45. A method as in claim 44, the anvil roll facilitating registration of bond loci activated as the first effect with bond loci activated as the second effect.

46. A method of fabricating a generally endless web, having a width, from a batt of loose, ultrasonically fusible fibers, the method comprising the steps of:

(a) feeding the batt of fibers in a feed direction into operative engagement with an anvil roll, the batt of fibers comprising first, second, and third separate and distinct segments over the width of the batt, the second segment being disposed between the first and third segments;

(b) using first and second rotary ultrasonic horns, ultrasonically bonding superposed ones of fibers in the first segment to each other, at first locations in the first segment while the first locations are disposed at a first locus on the outer circumference of the anvil roll, and ultrasonically bonding superposed ones of fibers in the third segment to each other, at second locations in the third segment while the second locations are disposed at the first locus on the outer circumference of the anvil roll, the first and second rotary ultrasonic horns being spaced from each other and having respective first and second axes of rotation, the second axis of rotation being substantially aligned with the first axis of rotation; and (c) using a third rotary ultrasonic horn, ultrasonically bonding superposed ones of fibers in the second segment to each other, at second locations in the second segment while the second locations are disposed at a second locus angularly displaced from the first locus, about the outer circumference of the anvil roll;

the first, second, and third rotary ultrasonic horns being configured and spaced across the width of the batt over the respective first through third segments, the ultrasonic bonding thus bonding substantially the entire width of the batt at the first, second, and third segments, to thereby consolidate the batt and form a web therefrom.

47. A method as in claim 46, the first location being disposed at a first nip between the first ultrasonic horn and the anvil roll, the third location being disposed at a third nip between the third ultrasonic horn and the anvil roll, the method comprising maintaining the batt in registration on the anvil roll between the first and third nips.

48. A method as in claim 46, the anvil roll having a pattern of raised elements on the outer circumferential surface thereof, the ultrasonic bonding being effected at the raised elements of the pattern.

49. A method as in claim 46, the first axis of rotation being substantially perpendicular to the direction of travel of the batt of fibers.

* * * * *

UNITED STATES PATENT AND TRADEMARK OFFICE
CERTIFICATE OF CORRECTION

PATENT NO. : 5,817,199
DATED : October 6, 1998
INVENTOR(S) : Craig Steven Brennecke et al.

It is certified that error appears in the above-identified patent and that said Letters Patent is hereby corrected as shown below:

Column 4, line 13, change "," to --.--
Column 9, line 51, after the words "anvil roll" insert --20--

In the Claims:
Claim 8, line 2, change "others" to --other--
Claim 24, line 5, change "well" to --web--

Signed and Sealed this

Twelfth Day of September, 2000

*Attest:*

Q. TODD DICKINSON

*Attesting Officer*     *Director of Patents and Trademarks*